Figure 1:
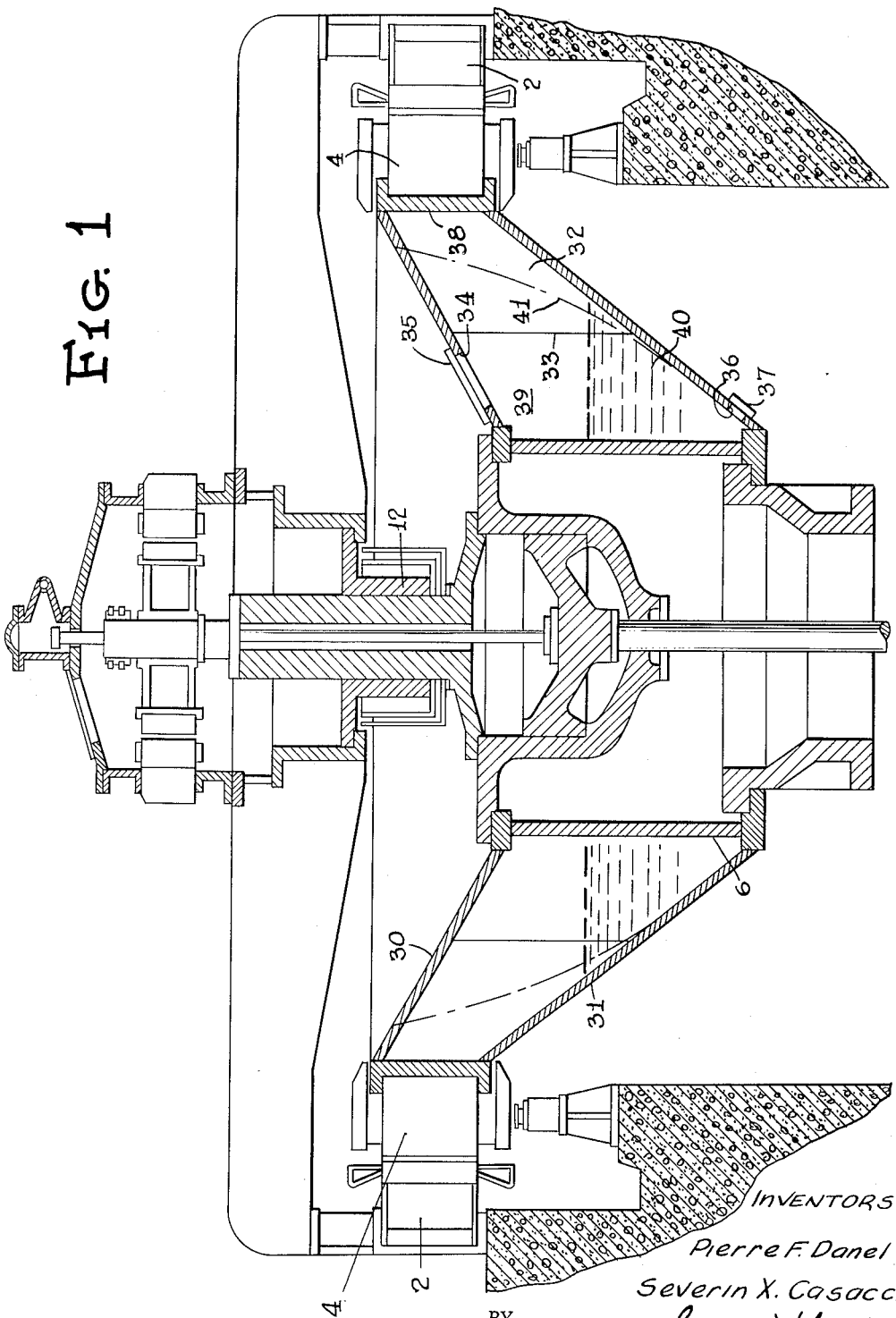

Nov. 1, 1955

P. F. DANEL ET AL
VERTICALLY DISPOSED HYDROELECTRIC
TURBINE-GENERATOR INSTALLATION 2,722,612

Filed June 25, 1953

2 Sheets-Sheet 1

INVENTORS
Pierre F. Danel
Severin X. Casacci
BY George H. Corey
ATTORNEY

Nov. 1, 1955

P. F. DANEL ET AL
VERTICALLY DISPOSED HYDROELECTRIC
TURBINE-GENERATOR INSTALLATION 2,722,612

Filed June 25, 1953

2 Sheets-Sheet 2

Inventors
Pierre F. Danel
Severin X. Casacci

BY George H. Cooley

ATTORNEY

United States Patent Office 2,722,612
Patented Nov. 1, 1955

2,722,612

VERTICALLY DISPOSED HYDROELECTRIC TURBINE-GENERATOR INSTALLATION

Pierre François Danel and Severin Xavier Casacci, Juares, Grenoble, France, assignors to Etablissements Neyrpic, Grenoble, France, a corporation of France Application June 25, 1953, Serial No. 364,064

Claims priority, application France June 25, 1952

16 Claims. (Cl. 290—52)

This invention relates to a vertically disposed hydroelectric turbine-generator installation. More particularly the invention relates to an improved arrangement for connecting the generator rotor to the turbine shaft of a vertically disposed hydroelectric turbine-generator installation.

In the heretofore known vertically disposed hydroelectric turbine-generator installations the shafting connecting the generator rotor to the turbine is usually of considerable length. For example, in a vertically disposed hydroelectric turbine-generator installation employing a so-called "umbrella" type generator the upper guide bearing, often combined with a thrust bearing, is placed substantially above the plane of the generator rotor. This arrangement up until now has been realized by connecting the generator rotor or runner to the rotor hub by arms inclined upwardly from the rim of the runner to the hub placed above the horizontal plane of the rotor. This involves prolongation of the shafting and usually two separate shafts are employed, a turbine shaft and a rotor or generator shaft.

It is an object of this invention to provide an arrangement in a vertically disposed hydroelectric turbine generator installation whereby the length of the shafting connecting the turbine and the generator rotor is considerably reduced.

It is another object of this invention to provide a more rigid and sturdy construction for a vertically disposed hydroelectric turbine-generator installation.

It is another object of this invention to provide an arrangement whereby the distance or gap between the generator stator and the generator rotor of a vertically disposed hydroelectric turbine-generator installation can be considerably reduced and made very small as compared with presently known installations.

Still another object of this invention is to provide an arrangement for connecting the turbine and the generator rotor of a vertically disposed hydroelectric turbine-generator installation which permits easy access to the thrust bearing for inspection purposes or for removal without requiring the removal or lifting of the generator rotor itself.

Figure 2:
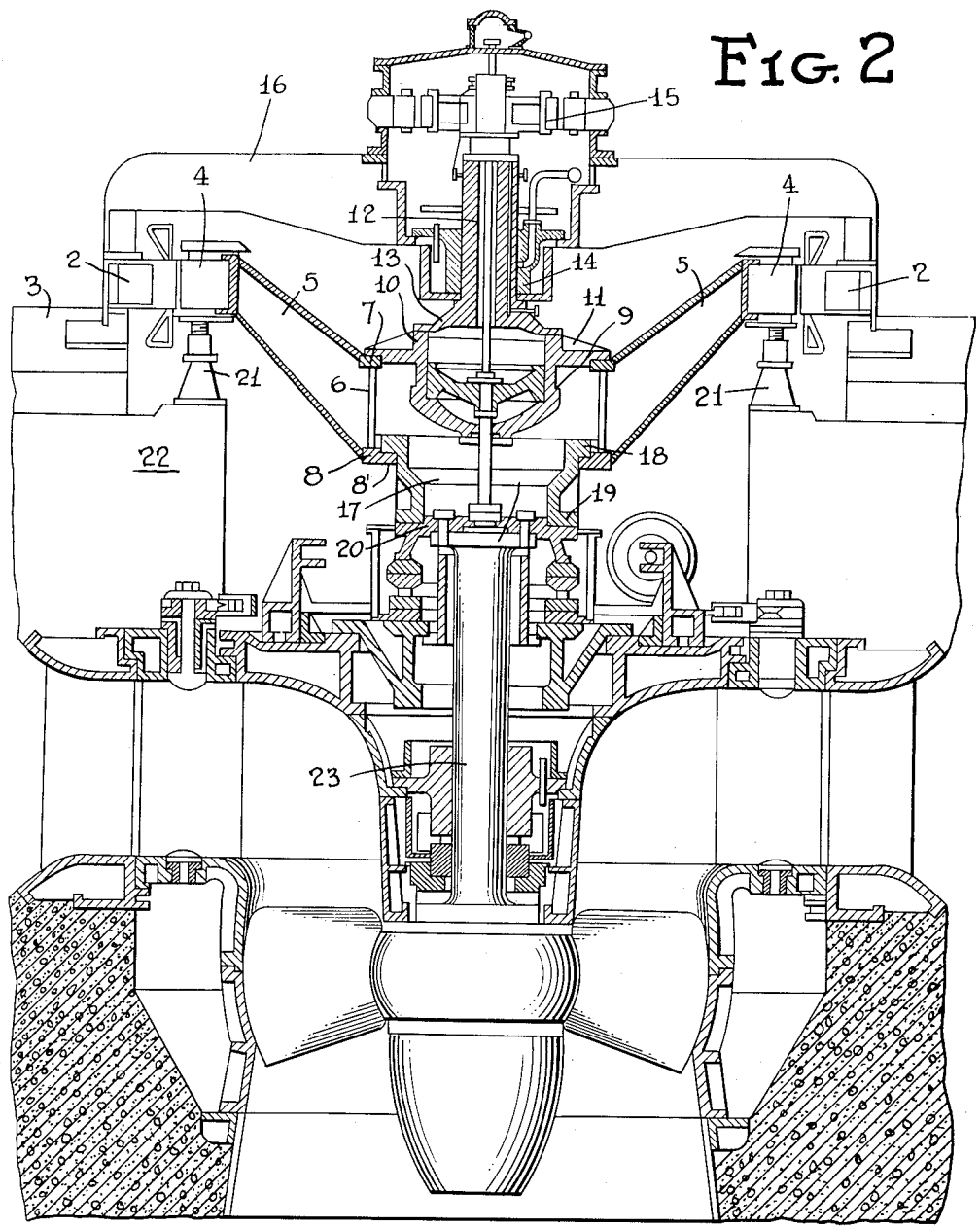

These and other objects of this invention and how they are accomplished will become apparent with reference to the accompanying disclosure and drawing, wherein:

Fig. 1 is a vertical view partly in section of a vertically disposed hydroelectric turbine-generator installation; and Fig. 2 is a partial vertical view partly in section of a vertically disposed hydroelectric turbine-generator installation, illustrating a modified form of the generator portion of the installation.

Briefly stated, in accordance with this invention, the generator rotor is connected to the upper end of a hollow member which is located intermediate the generator rotor and the upper end of the turbine shaft. The lower end of the hollow member is preferably provided with an inwardly extending flange which is connected to a lower annular member or ring which serves to directly transmit the weight of the generator rotor to a thrust bearing which in turn is operatively connected to the upper end of the turbine shaft. The aforesaid members are so arranged and dimensioned with respect to each other that the annular member or ring, upon being disconnected from the hollow connecting member can be moved up into the interior of the hollow member. The hollow member also acts as the hub of the generator rotor. The upper end of the hollow member has fixed thereto a shaft or trunnion which turns in an upper stationary guide bearing which is located substantially in the same horizontal plane as the generator rotor. The stationary upper guide bearing is supported by an upper cross bar extending across the top of the generator stator. In the case of a Kaplan type turbine, wherein a servo-motor usually comprising a piston and cylinder serves to control the pitch of the turbine blades, such servo-motor is preferably and advantageously located within the interior of the hollow connecting member.

Without departing from the inventive concept of this invention, the connection between the generator rotor and the turbine shaft which is described in the co-pending patent application Serial No. 345,931, filed March 31, 1953, can be adapted and modified to connect the generator rotor and the turbine shaft in accordance with this invention, so that the upper stationary guide bearing is at substantially the same elevation as the generator rotor.

This invention will now be described with reference to a particular embodiment thereof as applied to a vertically disposed hydroelectric turbine-generator installation employing a Kaplan type turbine. It is pointed out that the application of this invention is not limited to hydroelectric installations employing a Kaplan type turbine since other types of turbines may be employed in the practice of this invention.

Referring now to the drawing and to Fig. 1 in particular, the generator stator 2 is shown located at the floor level 3 of the power station. The generator rotor 4 is connected on the inside periphery thereof to arms 5 which are inclined downwardly and inwardly with respect to the generator rotor 4 and connected at their inner ends to a hollow member 6 which is located beneath the level of the generator rotor 4 and is provided at its upper and lower ends with annular flanges 7 and 8, respectively. The member 6 may take the form of a hollow cylinder having continuous side walls or the side walls may be discontinuous.

The cylinder 9 of the servo-motor which is employed to control the pitch of the turbine blades is located within the interior of member 6. The servo-motor cylinder 9 is provided with an outwardly extending flange 10 which is structurally reinforced by angles 11. The flange 10 is connected to the flange 7 on the upper end of member 6. A trunnion 12 having an enlarged lower end 13 rigidly connected to the upper end of the servo-motor cylinder 9 turns in a stationary guide bearing 14 and carries with it the exciter 15 mounted on the end of trunnion 12. The guide bearing 14 is supported by the generator stator cross arm 16 and is positioned substantially in the same horizontal plane as the generator rotor 4. This position is advantageous because by limiting the maximum displacements of the generator rotor due to deformations of the shafting connecting the generator rotor to the turbine shaft to a relatively low value the arrangement permits a much smaller gap between the stator and rotor of the generator than has been used in previous installations.

An annular member 17 which is provided with an outwardly extending flange 18 at its upper end and a flange 19 at its lower end, serves to directly transmit the weight of the generator rotor together with its operational parts to the thrust bearing sleeve 20. At the same time, member 17 also serves to transmit torque from the turbine shaft 23 to rotate generator rotor 4.

The member 17 is shaped and proportioned so as to be capable, when disconnected, of being moved upwardly within the interior of hollow member 6. For this reason it is preferably flangedly connected by means of its upper flange 18 to the inside flange 8' on the lower end of member 6. Flange 18 rests upon flange 8' and is connected thereto. The lower end of annular member 17, more particularly flange 19, is dimensioned so that its outside diameter is slightly smaller than the inside diameter of flange 8'. Also the outside diameter of servo-motor cylinder 9 as well as the inside surface contour of annular member 17 are designed and proportioned so that annular member 17, when disconnected, can be moved into the interior of member 6 to a position where it surrounds the servo-motor cylinder 9. Jacks 21 supported on abutments 22 are provided to block up and support the generator rotor 4 when it is desired to disconnect the annular member 17 and move it up into member 6.

The turbine shaft 23 is connected to and supported on thrust bearing sleeve 20 by means of the flanged coupling 24 which is provided on the upper end of shaft 23.

Due to the above described arrangement a number of advantages are realized:

1. Because of the forms given to the operational rotating parts and the arrangement employed, the ability of the connection between the generator rotor and the turbine shaft to resist deformation due to operational loads is considerably increased. This results in, amongst other things, a better functioning and longer life of the bearings, not only the thrust bearing but also the upper guide bearing, and permits a reduction in the gap between the rotor and the stator of the generator.

2. The length of the shafting connecting the rotor and turbine is reduced to the length of the turbine shaft. The decrease in length permits a reduction in the diameter of the turbine shaft without unduly risking dangerous deformation in the shaft due to operational loads.

3. The ability to move annular piece 17 upwardly within hollow member 6 after having blocked up the generator rotor permits the removal of the thrust bearing elements for maintenance and repair without having to lift and remove the generator rotor.

4. The servo-motor which acts to control the pitch of the turbine blades can easily be removed from the installation by lifting the cross bar 16 together with the exciter 15 and the stationary upper guide bearing 14, without having to remove the generator rotor.

5. Finally, in the above-described arrangement, the generator rotor is so located as to be protected from the water in case of flooding of the power station. At the same time the above-described arrangement allows the personnel operating the installation to gain easy and ready access to the space between the generator rotor and the turbine for the maintenance and repair of the thrust bearing and other parts of the installation.

Referring now to Fig. 2 of the drawings, there is illustrated therein another embodiment of this invention and, more particularly, another means of connecting the generator rotor to the turbine shaft. As in Fig. 1 the hollow member is shown located intermediate the generator rotor and the upper end of the turbine shaft. The same or equivalent operational parts of the arrangement illustrated in Figs. 1 and 2 are identified by the same reference numerals employed in the description of Fig. 1 of the drawing.

In Fig. 2 the generator rotor 4 is connected to the hollow member 6 by means of an inverted, hollow, double-walled truncated conical connecting member which comprises an upper wall 30 and a lower wall 31. As shown, the upper and lower walls making up the hollow, truncated conical connecting member extend downwardly and inwardly from the generator rotor 4 to the upper and lower ends of the hollow member 6, respectively. A plurality of partitions 32 symmetrically disposed within the interior of the hollow truncated conical member and connecting the upper wall 30 with the lower wall 31 extend from the outer periphery of the conical connecting member part of the way to the hollow member 6.

The inside vertical edges of the vertical partitions 32 are indicated at 33. A manhole opening 34 together with cover 35 is provided on upper wall 30 for access to the interior of the conical connecting member. The lower portion of the conical connecting member and more particularly the lower section of wall 31 is provided with a drainage opening 36 closed by a drain cap 37 to allow the removal of water from the interior of the hollow connecting member.

The illustrated conical connecting member provides a more rigid structural connection between the generator rotor 4 and the hollow member 6 than is afforded by the arrangement illustrated in Fig. 1 wherein the connecting members 5 may be standard I beams or channels or any other suitable structural member. Additionally, the vertical, radially disposed partitions 32 serve to structurally reinforce the conical connecting member and provide a very rigid structure.

The space within the hollow truncated conical connecting member defined by upper and lower walls 30 and 31 respectively, and their outer peripheral connecting ring 38 together with the hollow member 6 constitutes an annular reservoir 39 in which may be placed a calculated amount of a suitable liquid such as water so that when the conical connecting member rotates, the moment of inertia of the rotating assembly, including the liquid contained within the reservoir 39, varies with its speed of rotation. The liquid can be added to the conical connecting member through the opening 34 in the upper wall 30 thereof and can be removed therefrom through the opening 36 in the lower part of the lower wall 31.

The liquid in the reservoir 39 upon rotation of the conical connecting member is forced outwardly by centrifugal force into the spaces defined by the partitions 32 and becomes for operational purposes an integral part of the generator rotor and the rotating operational parts associated therewith and increases the moment of inertia of the generator rotor assembly. The form and the dimensions of the vertical radially disposed partitions are designed to intercept and to entrain during rotation an amount of water corresponding to the desired increase in the moment of inertia.

At low speeds of rotation, such as are experienced in starting up and stopping a generator rotor, all or almost all of the water within the reservoir 39 is located in the lower unpartioned part of the conical connecting member and tends to remain stationary since it is not entrained by the partitions 32. This facilitates starting the generator and substantially reduces the starting torque required to bring the generator rotor up to operating speed. When the generator rotor is being brought up to the desired operating speed, the body of liquid 40 which was originally in the lower part of the truncated conical connecting member is gradually forced outwardly of reservoir 39 into the spaces between partitions 32 and when operational speed is reached, the free surface profile of the entrained liquid assumes the shape indicated by a dot-dash line 41. Thus at operational speed the moment of inertia of the generator rotor assembly is considerably increased over what it would have been in the absence of the entrained liquid between the partitions 32. The entrained liquid quickly follows and responds to changes in the operating speed of the generator rotor.

It is possible to operate the hydroelectric turbine generator installation of Fig. 2 without the presence of any liquid within the reservoir 39 of the truncated conical member. This permits running in the equipment under a relatively light load. After the equipment has been run-in, the desired amount of liquid can be added through the manhole opening 34 so as to increase the moment of inertia of the generator rotor to the desired extent.

In the drawing the bolts and nuts connecting the flanged pieces of equipment, the electrical wiring and connections, pumps and conduits, etc., which go to make up a complete operational installation, have for the most part been omitted for the purposes of simplicity and clarity.

As will be obvious to those skilled in the art upon reading this disclosure, many modifications, changes and alterations may be made without departing from the spirit or scope of this invention.

We claim:

1. A vertically disposed hydroelectric turbine-generator installation comprising a horizontally disposed generator rotor, a turbine, a vertically disposed turbine shaft having its lower end operatively connected to said turbine, means located intermediate said rotor and the upper end of said turbine shaft operatively connecting the upper end of said shaft with said rotor, a stationary upper guide bearing located above said means connecting said turbine shaft and said rotor and lying substantially in the same horizontal plane as the generator rotor, and a shaft rigidly connected to said connecting means and extending within said guide bearing.

2. A hydroelectric turbine-generator installation in accordance with claim 1 wherein said means located intermediate said rotor and the upper end of said turbine shaft operatively connecting the upper end of said shaft with said rotor comprises a hollow cylindrical member.

3. A vertically disposed hydroelectric turbine-generator installation in accordance with claim 1 wherein the means located intermediate said rotor and the upper end of said turbine shaft operatively connecting the upper end of said shaft with said rotor comprises a hollow cylindrical member and an annular member flangedly connected to the lower end of said cylindrical member, the lower end of said annular member being rigidly connected to the upper end of said turbine shaft, said annular member being so dimensioned that it is adapted when disconnected to be moved upwardly within said cylindrical member.

4. A vertically disposed hydroelectric turbine-generator installation in accordance with claim 1 wherein said means located intermediate said rotor and the upper end of said turbine shaft comprises a hollow cylindrical member, an annular member flangedly connected to the lower end of said cylindrical member and so dimensioned that it is adapted when disconnected to be moved upwardly within said cylindrical member, the lower end of said annular member being rigidly connected to the upper end of said turbine shaft and a shaft rigidly connected to the upper end of said cylindrical member and extending within said stationary guide bearing.

5. A vertically disposed hydroelectric turbine-generator installation in accordance with claim 1 wherein said means located intermediate said rotor and the upper end of said turbine operatively connecting the upper end of said shaft with said rotor comprises a hollow cylindrical member, an annular member flangedly connected to the lower end of said cylindrical member and so dimensioned that it is adapted when disconnected to be moved upwardly within said cylindrical member, the lower end of said annular member being rigidly connected to the upper end of said turbine shaft, and a servo-motor cylinder located within said hollow cylindrical member and rigidly connected to the upper end thereof.

6. A vertically disposed hydroelectric turbine-generator installation in accordance with claim 1 wherein said means located intermediate said rotor and the upper end of said turbine shaft operatively connecting the upper end of said shaft with said rotor comprises a hollow cylindrical member and an inverted, hollow, double-walled truncated conical member connecting the upper and lower ends of said cylindrical member with said rotor.

7. A vertically disposed hydroelectric turbine-generator installation in accordance with claim 1 wherein said means located intermediate said rotor and the upper end of said turbine shaft operatively connecting the upper end of said shaft with said rotor comprises a hollow, cylindrical member and a plurality of structural connecting members symmetrically disposed around the outside of said cylindrical member and rigidly connecting said rotor with said cylindrical member.

8. A vertically disposed hydroelectric turbine generator installation in accordance with claim 1 wherein said means located intermediate said rotor and the upper end of said shaft operatively connecting the upper end of said shaft with said rotor comprises a hollow, continuous wall, cylindrical member and an inverted, hollow, double-walled truncated conical member rigidly connecting said rotor with the upper and lower ends of said cylindrical member, said truncated conical member being provided with a plurality of vertical partitions connecting the opposed double walls of said conical member and disposed therein radially and symmetrically with respect to said cylindrical member, said partitions extending only part of the way from the outer periphery of said conical member toward said cylindrical member.

9. A vertically disposed hydroelectric turbine-generator installation comprising a generator rotor, a turbine located beneath said rotor, a vertically disposed turbine shaft extending upwardly from and operatively connected to said turbine, means operatively connecting said rotor to the upper end of said turbine shaft comprising a hollow member located concentrically with respect to and intermediate the upper end of said turbine shaft and said rotor, means rigidly connecting said hollow member to said rotor, a hollow annular member concentrically located with respect to said hollow member and flangedly connected at its upper end to the lower end of said hollow member and so dimensioned that it is adapted when disconnected to be moved upwardly within said hollow member, a stationary upper guide bearing located concentrically with respect to and above said hollow member and substantially in the same horizontal plane as the generator rotor and a shaft rigidly connected to the upper end of said hollow member and extending within said guide bearing.

10. A vertically disposed hydroelectric turbine-generator installation in accordance with claim 9 wherein said hollow member is cylindrical in shape.

11. A vertically disposed hydroelectric turbine-generator installation in accordance with claim 9 wherein said means rigidly connecting said hollow member to the inside periphery of said rotor comprises an inverted, double-walled, truncated conical member.

12. A vertically disposed hydroelectric turbine-generator installation in accordance with claim 9 wherein said means rigidly connecting said hollow member to said rotor comprises a plurality of connecting structural members symmetrically disposed around the outside of said hollow member.

13. A vertically disposed hydroelectric turbine-generator installation in accordance with claim 9 wherein said means rigidly connecting said hollow member to said rotor comprises an inverted double-walled truncated conical member, said conical member being provided therein with vertical partitions connecting the opposed double walls of said conical member and disposed therein radially and symmetrically with respect to said hollow member, said partitions extending within said conical member from the outer periphery part of the way to said cylindrical member.

14. A vertically disposed hydroelectric turbine-generator installation in accordance with claim 9 wherein a servo-motor cylinder is concentrically located within said hollow member, the upper end of said servo-motor cylinder being rigidly connected to the upper end of said hollow member.

15. A vertically disposed hydroelectric turbine-generator installation comprising a generator rotor, a turbine located beneath said rotor, a vertically disposed turbine shaft extending upwardly from and operatively connected to said turbine, a hollow, cylindrical member located concentrically with respect to and intermediate the upper end of said turbine shaft and said rotor, a hollow, inverted double-walled truncated conical member rigidly connecting the upper and lower ends of said hollow, cylindrical member with said rotor, an annular member concentrically located with respect to said hollow cylindrical member and flangedly connected at its upper end to the inside lower end of said hollow member and so dimensioned that it is adapted when disconnected to be moved upwardly within said hollow member, the lower end of said annular member being fixed to the upper end of said turbine shaft, a stationary upper guide bearing located concentrically with respect to and above said hollow member and substantially in the same horizontal plane as the generator rotor, a servo-motor cylinder located concentrically within said hollow cylindrical member and flangedly connected to the upper end of said cylindrical member and an upper rotor shaft extending through said stationary guide bearing in bearing relationship therewith, the lower end of said rotor shaft being rigidly connected to the upper end of said servo-motor cylinder.

16. A vertically disposed hydroelectric turbine-generator installation in accordance with claim 15 wherein said annular member is so shaped and dimensioned that, when disconnected and moved upwardly within said hollow cylindrical member, it is adapted to fit around said servo-motor cylinder.

References Cited in the file of this patent

UNITED STATES PATENTS

| | | |
|---|---|---|
| 1,171,948 | Hassler | Feb. 15, 1916 |
| 2,281,214 | Van Erp | Apr. 28, 1942 |

FOREIGN PATENTS

| | | |
|---|---|---|
| 936,103 | France | Feb. 16, 1948 |